(12) United States Patent
Monga et al.

(10) Patent No.: US 9,404,655 B2
(45) Date of Patent: Aug. 2, 2016

(54) PROCESS OF FABRICATING A FUEL NOZZLE ASSEMBLY

(75) Inventors: Amit Monga, Bangalore Karnataka (IN); Nitin Subramanya Sarja, Bangalore Karnataka (IN); Bhaskara Rao Atchuta, Bangalore Karnataka (IN); John Greg Obeirne, Greenville, SC (US)

(73) Assignee: General Electric Company, Schenectady, NY (US)

( * ) Notice: Subject to any disclaimer, the term of this patent is extended or adjusted under 35 U.S.C. 154(b) by 950 days.

(21) Appl. No.: 13/354,400

(22) Filed: Jan. 20, 2012

(65) Prior Publication Data

US 2013/0186093 A1   Jul. 25, 2013

(51) Int. Cl.
| | | |
|---|---|---|
| *F23R 3/28* | (2006.01) | |
| *B23P 15/00* | (2006.01) | |
| *B23K 1/00* | (2006.01) | |
| *B23K 20/12* | (2006.01) | |

(52) U.S. Cl.
CPC ................. *F23R 3/28* (2013.01); *B23P 15/008* (2013.01); *B23K 1/0018* (2013.01); *B23K 20/12* (2013.01); *F23R 2900/00018* (2013.01); *Y10T 29/49323* (2015.01); *Y10T 29/49718* (2015.01)

(58) Field of Classification Search
CPC .. F23R 3/28; F23R 2900/00018; F23R 3/283; B23K 1/0018; B23K 20/12; F23D 2213/00; B23P 15/008; Y10T 29/49718; Y10T 29/49323
USPC .............. 29/889.22, 402.1; 60/740, 746, 747, 60/796, 800; 239/591
See application file for complete search history.

(56) References Cited

U.S. PATENT DOCUMENTS

| | | | | |
|---|---|---|---|---|
| 3,992,031 | A * | 11/1976 | Korger .......................... | 280/618 |
| 5,211,682 | A * | 5/1993 | Kadowaki et al. ............ | 123/531 |
| 7,134,287 | B2 * | 11/2006 | Belsom et al. ................. | 60/800 |
| 2010/0066035 | A1* | 3/2010 | Berry et al. .................... | 277/647 |
| 2010/0139238 | A1* | 6/2010 | Hall et al. ................. | 60/39.463 |
| 2010/0242493 | A1* | 9/2010 | Cihlar et al. .................... | 60/796 |
| 2012/0183911 | A1* | 7/2012 | Belsom .................. | F23R 3/283 431/144 |

* cited by examiner

*Primary Examiner* — Sarang Afzali
(74) *Attorney, Agent, or Firm* — McNees Wallace & Nurick LLC

(57) ABSTRACT

Disclosed is a process of fabricating a fuel nozzle assembly. The process includes providing a fuel nozzle end cover, positioning a fuel nozzle ring having a stepped geometry within a cavity of the fuel nozzle end cover, and securing the fuel nozzle ring to the fuel nozzle end cover by welding or brazing to form features corresponding to one or more of the fuel nozzle end cover and a fuel nozzle insert. The process further includes securing the fuel nozzle insert to the fuel nozzle cover by direct contact with the fuel nozzle ring.

14 Claims, 2 Drawing Sheets

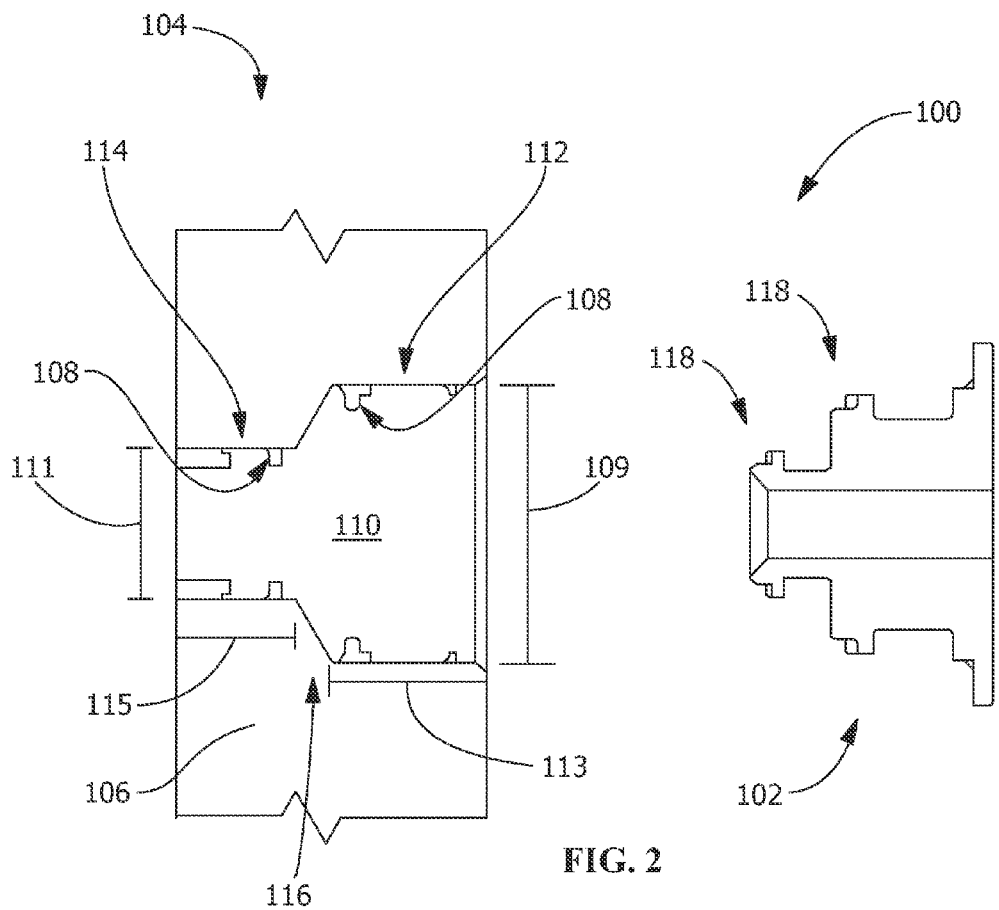
FIG. 2
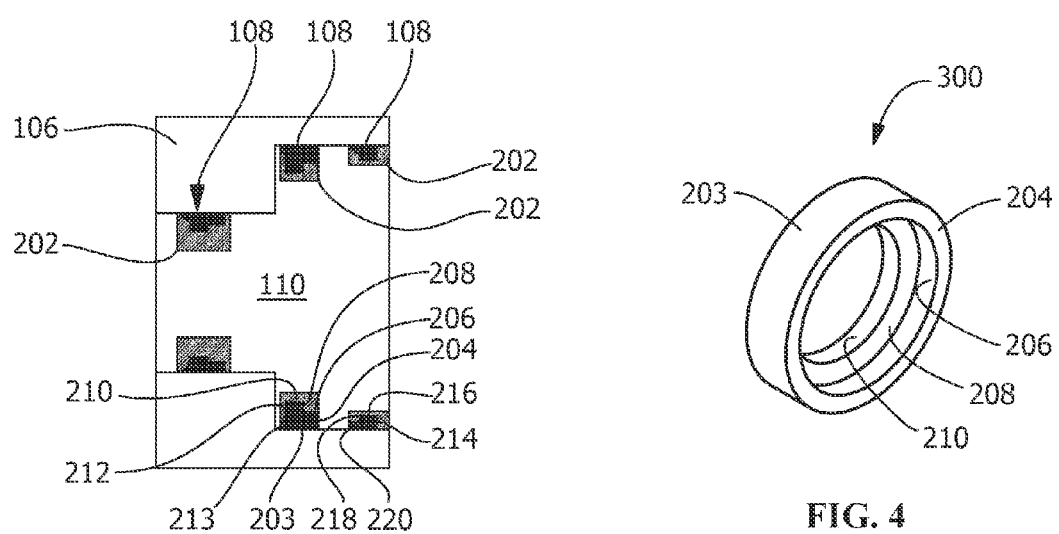
FIG. 3
FIG. 4

PROCESS OF FABRICATING A FUEL NOZZLE ASSEMBLY

FIELD OF THE INVENTION

The present invention is directed to fuel nozzle assemblies and processes of fabricating components of fuel nozzle assemblies. Most specifically, the present invention is directed to fuel nozzle end covers and processes of fabricating fuel nozzle end covers.

BACKGROUND OF THE INVENTION

In general, gas turbines are being subjected to more demanding operation. Higher temperatures, harsher environments, use in more diverse environments, and extended duration of use result in challenges for gas turbines and their components. Extending the useful life of such components and improving capability for repair of such components can decrease costs associated with the gas turbines and can increase the operational aspects of the gas turbines.

Known end covers in fuel nozzle assemblies in gas turbines have an insert brazed into the end cover. Generally, such inserts have four braze joints securing the inserts within the end cover. These braze joints are subject to failure, for example, resulting in leaking proximal to the braze joints. Such braze joints can also suffer from a drawback of requiring frequent repair. Such repairs can be complex and expensive. In addition, the ability to perform such repairs may be limited.

Repair of known end covers can result in further leaking that is not capable of being repaired. For example, when an insert is removed for repair, the braze joints are severed. Repeated severing of the braze joints can result in undesirable operational concerns, such as leaking, that is not capable of being adequately repaired. Known end covers suffer from a drawback of being limited to three such iterations of repeated repair.

A fuel nozzle assembly, a fuel nozzle end cover, and a process of fabricating a fuel nozzle end cover that do not suffer from one or more of the above drawbacks would be desirable in the art.

BRIEF DESCRIPTION OF THE INVENTION

In an exemplary embodiment, a process of fabricating a fuel nozzle assembly includes providing a fuel nozzle end cover, positioning a fuel nozzle ring within a cavity of the fuel nozzle end cover, and securing the fuel nozzle ring to the fuel nozzle end cover to form features corresponding to one or more of the fuel nozzle end cover and a fuel nozzle insert.

In another exemplary embodiment, a process of fabricating a fuel nozzle ring includes forming the fuel nozzle ring with at least one surface corresponding to one or more of a fuel nozzle end cover and a fuel nozzle insert.

In another exemplary embodiment, a fuel nozzle ring includes at least one surface corresponding to one or more of a fuel nozzle end cover and a fuel nozzle insert.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is a schematic section view of an exemplary fuel nozzle assembly having a fuel nozzle end cover and a fuel nozzle insert with the fuel nozzle insert shown in a removed position according to an embodiment of the disclosure.

FIG. 3 is a schematic view of an exemplary fuel nozzle end cover having one or more features extending into a cavity of a fuel nozzle end cover according to an embodiment of the disclosure.

FIG. 4 is a perspective view of a fuel nozzle ring according to an embodiment of the disclosure.

Wherever possible, the same reference numbers will be used throughout the drawings to represent the same parts.

DETAILED DESCRIPTION OF THE INVENTION

Figure 1:
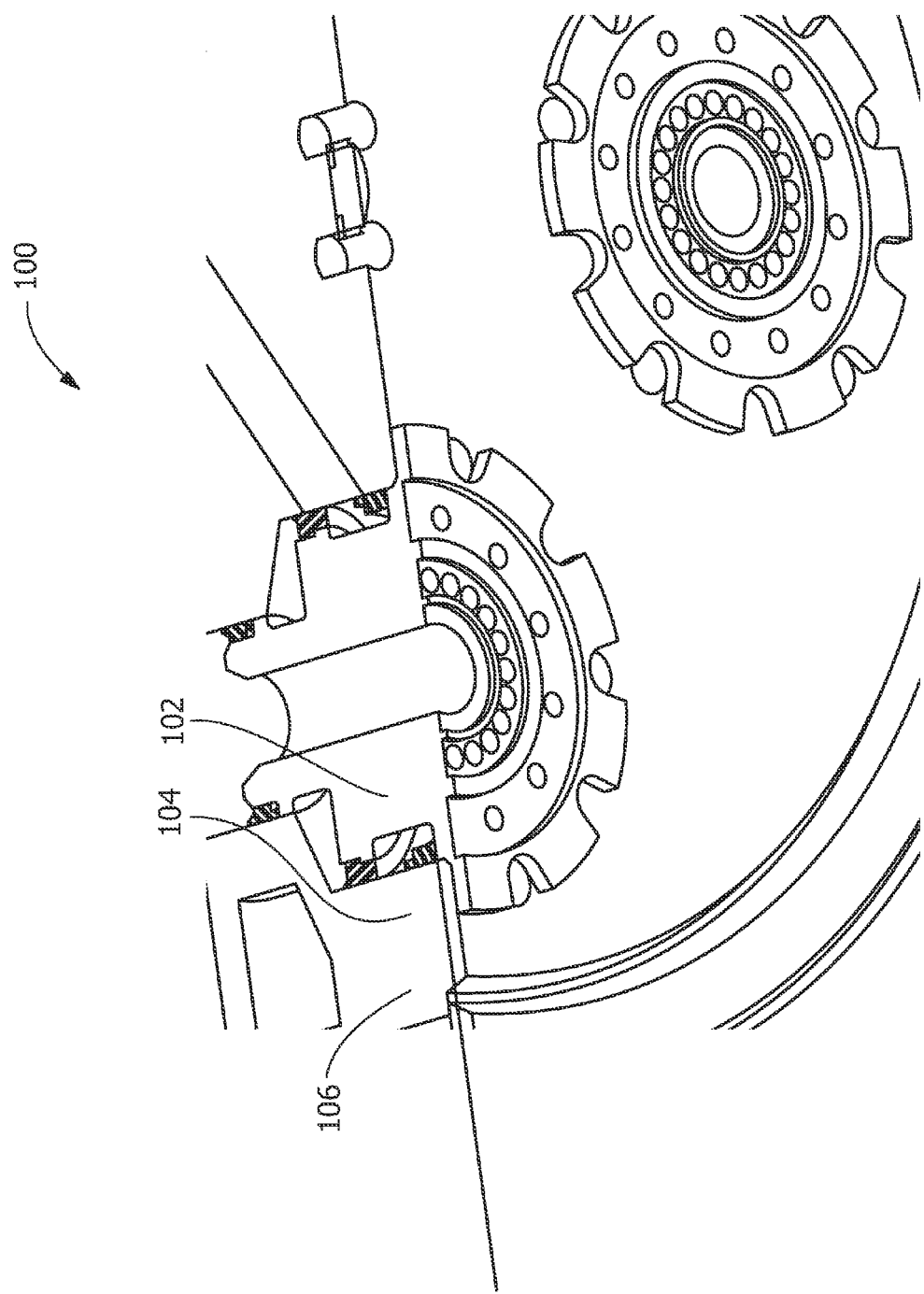
FIG. 1 is a cutaway section view of an exemplary fuel nozzle assembly having a fuel nozzle end cover and a fuel nozzle insert with the fuel nozzle insert shown in an inserted position according to an embodiment of the disclosure.

Provided is an exemplary fuel nozzle assembly, a fuel nozzle end cover, and a process of fabricating a fuel nozzle end cover that do not suffer from one or more of the above drawbacks. Embodiments of the present disclosure permit fuel nozzle assemblies to be used for longer periods of time, permit fuel nozzle assemblies to be repaired in a simpler manner, permit fuel nozzle assemblies to be repaired more times (for example, more than three times), decrease operational costs of repair, prevent leaks in fuel nozzle assemblies, and combinations thereof.

FIGS. 1-2 show an exemplary fuel nozzle assembly 100. The fuel nozzle assembly 100 includes a fuel nozzle insert 102 and a fuel nozzle end cover 104. The fuel nozzle insert 102 is capable of being removably secured within the fuel nozzle end cover 104. FIG. 1 shows the fuel nozzle insert 102 inserted in the fuel nozzle end cover 104. FIG. 2 shows the fuel nozzle insert 102 prior to insertion or after being removed from the fuel nozzle end cover 104. The fuel nozzle assembly 100 can be a portion of any suitable system (not shown). In one embodiment, the fuel nozzle assembly 100 is a portion of a gas turbine system.

Referring to FIG. 2, the fuel nozzle end cover 104 includes a base material 106 and one or more features 108 extending from the base material 106 into a cavity 110 formed by the fuel nozzle end cover 104. The base material 106 is any suitable metal or metallic composition. In one embodiment, the base material 106 is or includes stainless steel or stainless steel variations.

In one embodiment, the cavity 110 includes substantially cylindrical portions forming (for example, by boring) the base material 106. For example, in one embodiment, a first cylindrical portion 112 is separated from a second cylindrical portion 114 by one or more of the features 108. In this embodiment, the first cylindrical portion 112 has a first diameter 109 (for example, about 4 inches) that is larger than a second diameter 111 (for example, about 2.3 inches) of the second cylindrical portion 114, the first diameter 109 differing from the second diameter 111. In one embodiment, the first cylindrical portion 112 has a first depth 113 (for example, about 1.4 inches) and the second cylindrical portion 114 has a second depth 115 (for example, about 2.3 inches), the first depth differing from the second depth. In a further embodiment, a frustoconical portion 116 separated from the first cylindrical portion 112 and the second cylindrical portion 114 by the features 108 is included.

The features 108 are arranged and disposed to facilitate removable securing of the fuel nozzle insert 102 to the fuel nozzle end cover 104 in the cavity 110. For example, the features 108 extend into the cavity 110 forming concentric rings corresponding to protrusions 118 on the fuel nozzle insert 102. The protrusions 118 each have a geometry corresponding to the geometry of the features 108, thereby permitting the fuel nozzle insert 102 in a predetermined position within the fuel nozzle end cover 104 (for example, in one embodiment, the predetermined position is defined by the geometry of the fuel nozzle insert 102, the fuel nozzle end cover 104, and/or the features 108). In some embodiments, the features 108 are formed within the fuel nozzle end cover 104. In other embodiments, one or more of the features 108 are formed from a fuel nozzle ring 300 (see FIG. 4) formed outside of the fuel nozzle end cover 104. As used herein, the term "ring" is broadly used to describe any suitable annular structure. In one embodiment, the protrusions 118 and the features 108 mechanically secure the fuel nozzle insert 102 within the fuel nozzle end cover 104. In another embodiment, the protrusions 118 and the features 108 are secured to one another by welding, such as, beam welding (laser and/or electron beam), friction welding, gas tungsten arc welding, gas metal arc welding, or combinations thereof.

In one embodiment, a plurality of the features 108 is positioned within each of the first cylindrical portion 112 and the second cylindrical portion 114. In other embodiments, only one of the features 108 is positioned in each of the first cylindrical portion 112 and the second cylindrical portion 114. Additionally or alternatively, in one embodiment, one or more of the features 108 extend circumferentially around the cavity 110 through the first cylindrical portion 112 and/or the second cylindrical portion 114. In another embodiment, one or more of the features 108 are discontinuously circumferential within the cavity 110.

Referring to FIG. 3, in one embodiment, the features 108 are machined from a simple geometry 202 (for example, a substantially cuboid geometry) to any suitable predetermined geometry. In one embodiment, at least one of the features 108 has a stepped geometry. In a further embodiment, at least one of the features 108 includes a first surface 203 extending abutting the base material 106 when secured, a second surface 204 extending in a direction substantially perpendicular to the first surface 203 (for example, away from the fuel nozzle end cover 104), a third surface 206 extending in a direction substantially perpendicular to the second surface 204 (for example, parallel to the first surface 203), a fourth surface 208 extending in a direction substantially perpendicular to the third surface 206 (for example, toward the cavity 110), a fifth surface 210 extending in a direction substantially perpendicular to the fourth surface 208 (for example, parallel to the first surface 203), a sixth surface 212 extending in a direction substantially perpendicular to the fifth surface 210 when secured (for example, in a direction toward the base material 106), and a seventh surface 213 extending from the fourth surface 212 to the base material 106 when secured (for example, at an angle other than ninety degrees). In one embodiment, at least one of the features 108 includes a geometry that is not stepped. For example, in a further embodiment, at least one of the features 108 includes a first substantially planar surface 214 extending from the base material 106, a second substantially planar surface 216 extending from the first substantially planar surface 214, and a third substantially planar surface 218 extending from the second substantially planar surface 216. The first substantially planar surface 214, the second substantially planar surface 216, and the third substantially planar surface 218 form a substantially cuboid geometry with a sloping portion 220 extending from the third substantially planar surface 218 to the base material 106.

The features 108 are secured to the base material 106 by any suitable process. The securing of the features 108 to the base material 106 results in a predetermined microstructure (not shown) based upon the welding process utilized. The securing is performed by one or more of beam welding (such as laser and/or electron beam), friction welding, gas tungsten arc welding (such as tungsten inert gas welding), and gas metal arc welding (such as metal inert gas welding). In one embodiment, such as in embodiments with the securing being by beam welding, or friction welding, the predetermined microstructure includes a first heat affected zone proximal to the base material 106 that has a predetermined microstructure, a second heat affected zone between the first heat affected zone and a fusion zone, the fusion zone between the second heat affected zone and a third heat affected zone, the third heat affected zone between the fusion zone and a fourth heat affected zone, and the fourth heat affected zone between the third heat affected zone and the unaffected portions of the feature 108. In one embodiment, each of the zones has a different microstructure. As will be appreciated by those skilled in the art, other embodiments include characteristics distinguishing from techniques using brazing.

In one embodiment, securing of the features 108 to the base material 106 permits repeated insertion and removal of the insert 102 into the fuel nozzle end cover 104. For example, in one embodiment, the insert 102 is capable of being removed from the fuel nozzle end cover 104 with little or no damage to the fuel nozzle assembly 100 at least a predetermined number of times, for example, more than three times, more than four times, more than five times, or more than ten times.

The features 108 are any suitable material. In one embodiment, one or more of the features 108 have a different composition than the base material 106. In one embodiment, the material of the features 108 includes an equal or greater ductility in comparison to materials used for brazing and/or than the base material 106 would have when secured by welding, such as, beam welding (such as laser and/or electron beam), friction welding, (such as tungsten inert gas welding), and/or gas metal arc welding (such as metal inert gas welding).

In one embodiment, the features 108 and/or the base material 106 include a stainless steel composition. For example, in one embodiment, the features 108 and/or the base material 106 include austenitic stainless steel. In another embodiment, the features 108 and/or the base material 106 include ferritic stainless steel. In another embodiment, the features 108 and/or the base material 106 include martensitic stainless steel. In further embodiments, the features 108 include austenitic stainless steel, ferritic stainless steel, or martensitic stainless steel and the base material 106 includes a different stainless steel selected from the group of austenitic stainless steel, ferritic stainless steel, and martensitic stainless steel.

In one embodiment, a process of fabricating the fuel nozzle end cover 104 includes positioning the fuel nozzle ring 300 (shown in FIG. 4) within the cavity 110 of the fuel nozzle end cover 104 or otherwise within the fuel nozzle assembly 100. The fuel nozzle ring 300 is then secured to the fuel nozzle end cover 104, either directly or indirectly. In one embodiment, the fuel nozzle ring 300 is machined to a predetermined geometry, for example, corresponding to one or more of the fuel nozzle end cover 104 and the fuel nozzle insert 102. The machining is prior to the securing of the fuel nozzle ring 300 to the fuel nozzle end cover 104 or subsequent to the securing of the fuel nozzle ring 300 to the fuel nozzle end cover 104. In one embodiment, the securing is by brazing and/or the other securing techniques described above with reference to securing of the features 108 generally. In one embodiment, the securing is through the fuel nozzle ring 300. In one embodiment, a second fuel nozzle ring 300 is secured to the fuel nozzle end cover 104 or otherwise within the fuel nozzle assembly 100. In further embodiments, a plurality of the fuel nozzle rings 300 are secured to the fuel nozzle end cover 104, to the fuel nozzle insert 102, or otherwise to the fuel nozzle assembly 100. For example, in one embodiment, the fuel nozzle rings 300 are secured in two, three, four, or more positions within the fuel nozzle assembly 100. Additionally or alternatively, in other embodiments, the fuel nozzle insert 102 and/or the fuel nozzle end cover 104 are machined to geometries corresponding to each other and/or the fuel nozzle ring(s) 300. For example, in one embodiment, the fuel nozzle ring 300 includes a geometry that corresponds to the fuel nozzle insert 102 and is machined to correspond to the fuel nozzle end cover 104 or includes a geometry that corresponds to the fuel nozzle end cover 104 and is machined to correspond to the fuel nozzle insert 102.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A process of fabricating a fuel nozzle assembly, the process comprising:
    providing a fuel nozzle end cover having a single central through-hole extending from a first axial end of the fuel nozzle end cover to a second axial end of the fuel nozzle end cover opposite the first axial end;
    positioning a fuel nozzle ring having an annular shape within the central through-hole of the fuel nozzle end cover, the fuel nozzle ring contacting an inner circumferential surface of the fuel nozzle end cover, the central through-hole and the fuel nozzle ring having a combined geometry configured to receive a single fuel nozzle insert, the combined geometry including a stepped geometry of the fuel nozzle ring;
    securing by welding or brazing the fuel nozzle ring to the fuel nozzle end cover to form features extending from the fuel nozzle ring into the central through-hole corresponding to a circumferential outer surface of the fuel nozzle insert; and
    securing the fuel nozzle insert to the fuel nozzle end cover through the fuel nozzle ring such that the fuel nozzle insert directly contacts the fuel nozzle ring.

2. The process of claim 1, further comprising machining the fuel nozzle ring.

3. The process of claim 2, wherein the machining of the fuel nozzle ring is prior to the securing of the fuel nozzle ring to the fuel nozzle end cover.

4. The process of claim 2, wherein the machining of the fuel nozzle ring is subsequent to the securing of the fuel nozzle ring to the fuel nozzle end cover.

5. The process of claim 1, wherein the securing by welding or brazing is by a welding process selected from the group consisting of beam welding, friction welding, gas tungsten arc welding, gas metal arc welding, and combinations thereof.

6. The process of claim 1, wherein the securing by welding or brazing is by tungsten inert gas welding.

7. The process of claim 1, wherein the securing by welding or brazing is by electron beam welding.

8. The process of claim 1, wherein the securing by welding or brazing is by brazing.

9. The process of claim 1, wherein the fuel nozzle ring has a different composition than the fuel nozzle end cover.

10. The process of claim 1, wherein the fuel nozzle ring has a different ductility than the fuel nozzle end cover.

11. The process of claim 1, wherein the combined geometry includes a first surface on the fuel nozzle ring extending from the fuel nozzle end cover, a second surface on the fuel nozzle ring extending from the first surface in a direction substantially perpendicular to the first surface, a third surface on the fuel nozzle ring extending from the second surface in a direction substantially perpendicular to the second surface, a fourth surface on the fuel nozzle ring extending from the third surface in a direction substantially perpendicular to the third surface, and a fifth surface on the fuel nozzle ring extending from the fourth surface in a direction substantially perpendicular to the fourth surface.

12. The process of claim 1, wherein the fabricated fuel nozzle assembly was not previously used in a gas turbine operating equipment operation.

13. The process of claim 1, wherein the fuel nozzle ring includes stainless steel.

14. The process of claim 1, further comprising securing a second ring to the fuel nozzle end cover.

* * * * *